May 20, 1930.  F. F. BRUCKER  1,759,685
METHOD OF AND MEANS FOR APPLYING PACKING GASKETS AND ANALOGOUS ARTICLES
Filed Jan. 12, 1928
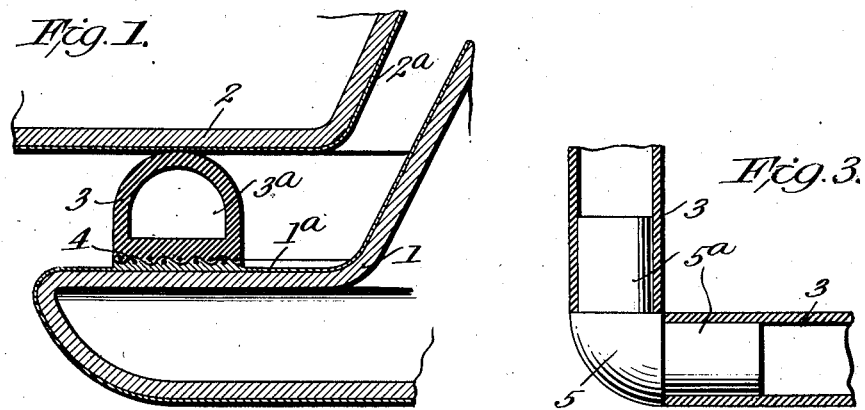
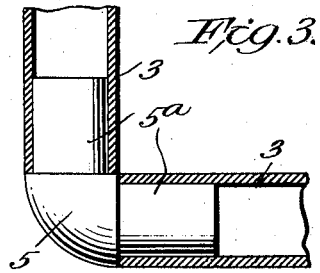
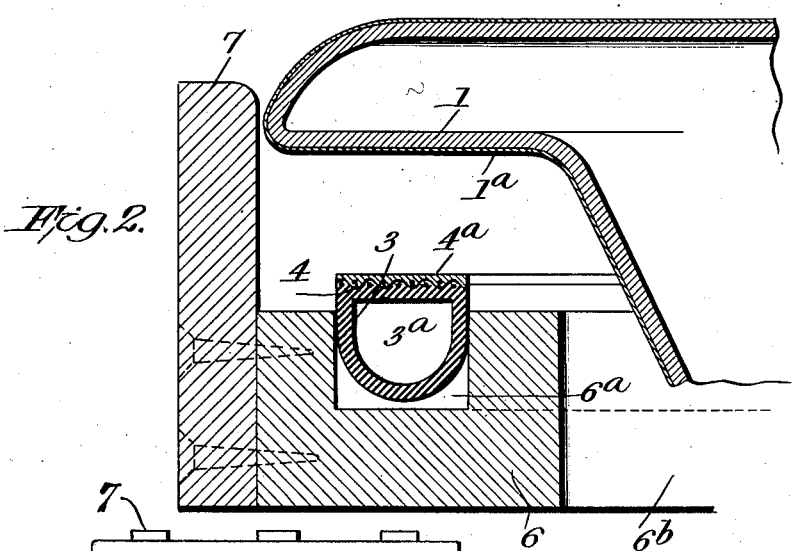
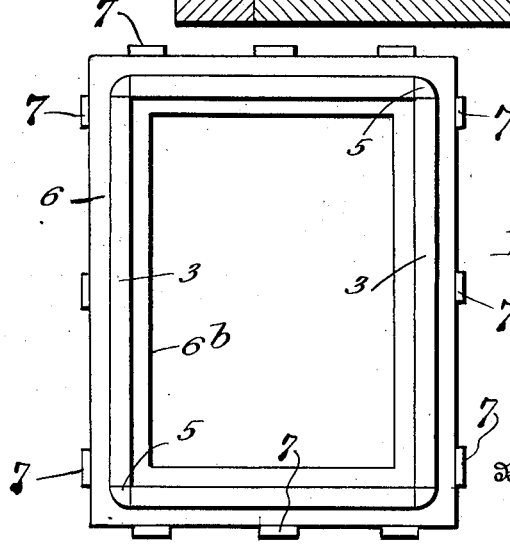
Inventor
Ferdinand F. Brucker Patented May 20, 1930

1,759,685

UNITED STATES PATENT OFFICE

FERDINAND F. BRUCKER, OF AKRON, OHIO, ASSIGNOR TO THE MILLER RUBBER COMPANY, OF AKRON, OHIO, A CORPORATION OF OHIO

METHOD OF AND MEANS FOR APPLYING PACKING GASKETS AND ANALOGOUS ARTICLES

Application filed January 12, 1928. Serial No. 246,356.

My said invention relates primarily to a method of applying rubber articles to other articles having a pyroxylin or cellulose lacquer surface with a view to effecting a strong and permanent union therebetween.

It also relates to a method of and means for applying packing gaskets to closure members having such coatings or surface finish of such cellulose or pyroxylin lacquer material, which is mentioned as a specific example of use for which my improved method is extremely advantageous.

It is desirable to provide the doors of metal refrigerators of the type now commonly found on the market, having a finish of the pyroxylin lacquer type, with rubber packing preferably of the hollow type, but great difficulty has been experienced heretofore in effecting a permanent junction of the packing thereto. Resort has been had to mechanical fastening means which are expensive and unsatisfactory as due to the different characteristics of rubber and the lacquer finish it has heretofore been found impossible to secure the gasket thereto by the customary adhesive methods, as for example by the use of a rubber cement.

This is accomplished by the method and means hereinafter set forth, my invention being defined by the appended claims.

In order that the invention may be better understood, reference is made to the accompanying drawing in which Figure 1, is a fragmentary sectional view through a portion of a door and its coacting jamb showing the gasket applied thereto.

Figure 2, is a similar view through the door and applying frame or device, showing the gasket separated from the surface to which it is to be applied.

Figure 3, is a fragmentary plan view illustrating the method of effecting the corner junction of the packing members.

Figure 4, is a plan view of the applying frame with the gasket in place in the channel thereof.

In this drawing the door is indicated at 1 and the jamb at 2.

The gasket 3 is shown as applied to the door, which is most convenient, but it will be obvious that it could be applied to the jamb if desired and when in the appended claims I use the term "door member" I intend this to include either the door proper or the door jamb. The gasket is preferably of D shape in cross section, as shown, as this has been found preferable but I do not limit myself to this specific form.

In order to effect a simple, economical and permanent union of the gasket to the lacquer finished surface, I provide the flat face or base thereof with a layer of textile material such as a woven fabric indicated at 4.

This fabric may be firmly affixed to the gasket 3 by any suitable method, it being essential, however, that the exposed face of the fabric shall be free from any coating or impregnating substance.

The gasket may be produced in any desired manner, as for instance, by the use of the tube extruding machine having a die opening of the proper shape in cross section.

The fabric 4 may, previous to its application to the gasket, be frictioned or frictioned and coated on one side with rubber, care being taken that the rubber does not penetrate to the opposite face, and the thus coated face cemented or united to the gasket and (or) vulcanized thereto in the manner well known to those skilled in the rubber working art; or the fabric may be entirely unfrictioned or uncoated and the fabric and extruded rubber having been brought together in a mold and a blower introduced into the cavity $3^a$ of the gasket and the ends thereof pinched shut, the blower may be expanded in the mold during vulcanization so as to bring the gasket in contact with the mold and to drive a contacting face of rubber partially into the layer of fabric 4, leaving the other side uncoated. Or the extruded and cured or molded and cured rubber part may be cemented to fabric coated on one side and the joint left unvulcanized.

Having prepared the gasket by any of the above means the next step is to coat or saturate the uncoated face of the fabric layer 4 either with a solution of pyroxylin or cellulose materials or with a pyroxylin or cellulose solvent and the next step is to press this coated face against the enameled surface 1ª of the steel door 1, whereupon the solvent will attack the coating 1ª, and soften the same, which upon the evaporation of the solvent will harden and cause a secure and permanent bond between the fabric and the door.

I have found by experiment that whereas the solvent of the lacquer finish 1ª may be used alone to treat the fabric layer 4 by which it will be absorbed and from which it will afterwards attack the enamel surface 1ª, this does not produce as satisfactory a joint as where a solution of pyroxylin lacquer or colorless lacquer is used.

This is because of the fact that where the solvent alone is used its effect on the finish 1ª is to immediately penetrate entirely to the steel 1, and where a long strip is to be applied the solvent will evaporate from the fabric much faster than where a cellulose solution is used.

Where a solution such as lacquer enamel is used the fabric is more thoroughly bonded to the lacquer before application, and the amount of solvent present being smaller there is not the tendency to form such a thin solution with the coating 1ª, and adhesion is therefore better.

I have found that it is not necessary to use continuous pressure in attaching the gasket. The fibers of the fabric provide an easy path for all solvents to evaporate, allowing the pyroxylin or cellulose solution to completely harden.

One of the difficulties encountered in using this type of gasket fastened by any means is where it must be applied to a square door as when any attempt is made to mitre the gasket even though the butt joint is cemented together the compression of the door against the gasket is liable to open the joints and cause air leaks at this joint. In order to avoid this, I mold a special corner piece shown in Fig. 3 and designated by the numeral 5, and having reduced extension 5ª, whose outside diameter is about equal to the inside diameter of the ordinary gasket, which may be telescoped thereover as indicated in the figure.

Where it is desired to turn a corner, it is preferable to use such a corner piece and applying cement to the extensions 5ª, these can be slipped in to the ends of the straight gasket, making a uniform appearance which will not open at the joints.

The part 5 being very small or short does not necessarily have to be provided with the fabric as the strong attachments of the adjacent straight run of gasket are sufficient to hold it in place.

In applying a gasket of this type, it is necessary to provide a means of applying the gasket accurately to make a neat appearance. To accomplish this, referring to Figure 2 I provide a frame 6 of the shape of the door and provide it with a continuous groove 6ª plowed in its upper face, which groove corresponds in width with the gasket and is slightly less in depth. By making this jig in the form of a frame, I provide a center opening 6ᵇ to clear the projecting center of the door.

Around this frame at intervals I provide guide pieces or dowels 7 for guiding the door.

In use the gasket 3 being composed of straight pieces and corners, is assembled in the groove 6ª with its attaching face projecting outward, the coating 4ª of lacquer solution is applied, the door 1 is then guided into place by the guides 7, until it rests in contact and the gasket is thus applied in exactly the right position and properly aligned.

The door may there upon be lifted from the jig and placed on a drying rack and the operation repeated.

My invention is also useful for securing rubber articles to uncoated surfaces, in which case it is only necessary to first apply to the surface a coating pyroxylin lacquer or enamel and allow the same to dry, whereafter the fabric base of the rubber article is saturated with the solvent or the lacquer solution, and the union effected in the manner that will be clear from the foregoing description.

Having thus described my invention what I claim is—

1. The herein described method of applying rubber to another article, which consists in providing the surface of the article with a soluble enamel coating, providing the rubber with a fibrous backing, saturating the face of the fibrous backing with a material comprising a solvent of enamel and pressing the same against the enamelled surface of the article.

2. The herein described method of applying rubber to another article, which consists in providing the surface of the article with a soluble enamel coating and allowing the same to harden, providing the rubber with a fibrous backing, saturating the face of the fibrous backing with a material comprising a solvent of enamel and pressing the same against the enamelled surface of the article.

3. The herein described method of fastening a rubber article to an enamelled surface which consists in providing the rubber article with a fabric backing having a raw face, coating said raw face with a solution of enamel similar to that to which it is to be applied, and bringing the enamelled surfaces into contact before at least one of them is dried.

4. The herein described method of applying a rubber gasket to closure members having a lacquer finish which consists in securing to said gasket a textile strip having its exposed surface free from coating material and attaching said textile to the hardened lacquer finished surface by a material having a softening effect on said finish.

5. The herein described method of applying a rubber gasket to closure members having a lacquer finish which consists in securing to said gasket a textile strip having its exposed surface free from coating material saturating said exposed textile with a lacquer solvent, and applying the saturated textile surface of said gasket to the finished surface.

6. The method of claim 4 in which the lacquer softening means consists of a solution of lacquer enamel.

7. The herein described method of fastening a rubber article to a nitro-cellulose surface which consists in providing the rubber article with a fabric backing having a raw face, coating said raw face with a solution of nitro cellulose similar to that to which it is to be applied, and bringing the nitro cellulose surfaces into contact before at least one of them has dried.

In testimony whereof, I affix my signature.

FERDINAND F. BRUCKER.